United States Patent [19]

Johnson

[11] Patent Number: 4,687,532

[45] Date of Patent: Aug. 18, 1987

[54] SLIT SEALING METHOD AND APPARATUS

[76] Inventor: James R. Johnson, 3819 Greenhill Dr., Chamblee, Ga. 30341

[21] Appl. No.: 817,270

[22] Filed: Jan. 9, 1986

[51] Int. Cl.4 .......................................... B32B 31/18
[52] U.S. Cl. .................................. 156/251; 156/259; 156/271; 156/515
[58] Field of Search ............... 156/250, 251, 259, 510, 156/515, 271, 267

[56] References Cited

U.S. PATENT DOCUMENTS

| 2,587,685 | 3/1952 | Bergstein | 156/259 |
| 3,156,010 | 11/1964 | Osborn | 156/515 |
| 4,070,222 | 1/1978 | Olson | 156/251 |
| 4,259,134 | 3/1981 | Joice et al. | 156/251 |
| 4,308,087 | 12/1981 | Johnson | 156/510 |
| 4,318,768 | 3/1982 | Johnson | 156/515 |
| 4,396,449 | 8/1983 | Tumminia | 156/251 |

Primary Examiner—Caleb Weston
Attorney, Agent, or Firm—James B. Middleton

[57] ABSTRACT

A method and apparatus for slit sealing thermoplastic materials, primarily linear low density polyethylene, either alone or with coextrusions of other materials. The material is passed over a presealing roll, and the area to be slit is presealed using heated air. Very quickly after the presealing, the material is slit with a heated knife blade, the slit edges being sealed by dragging along the sides of the heated blade. The cutting edge of the blade is angled to roll a bead upwardly on the material, and the slit edges are held taut and separated by an edge holding device.

7 Claims, 4 Drawing Figures

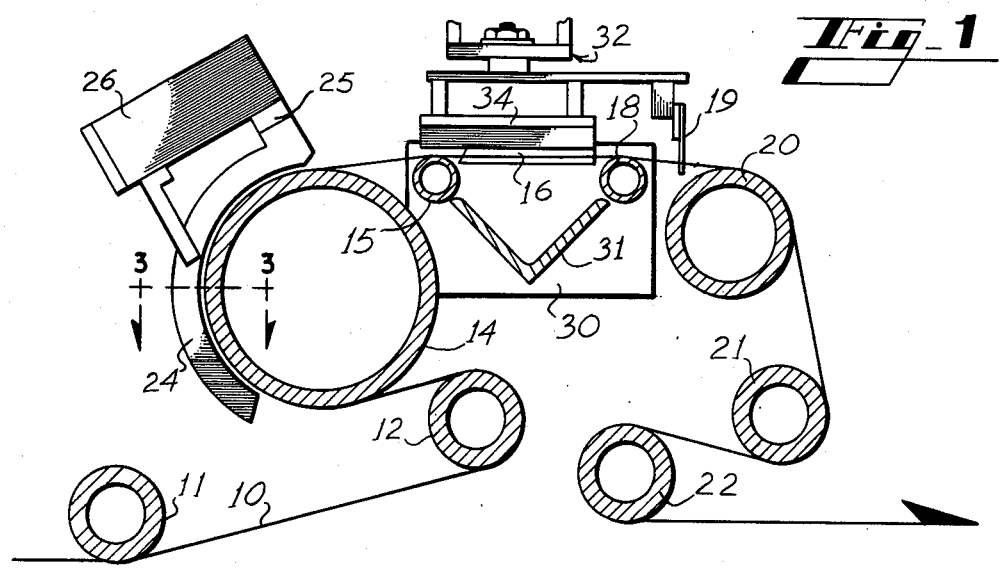
*Fig_1*
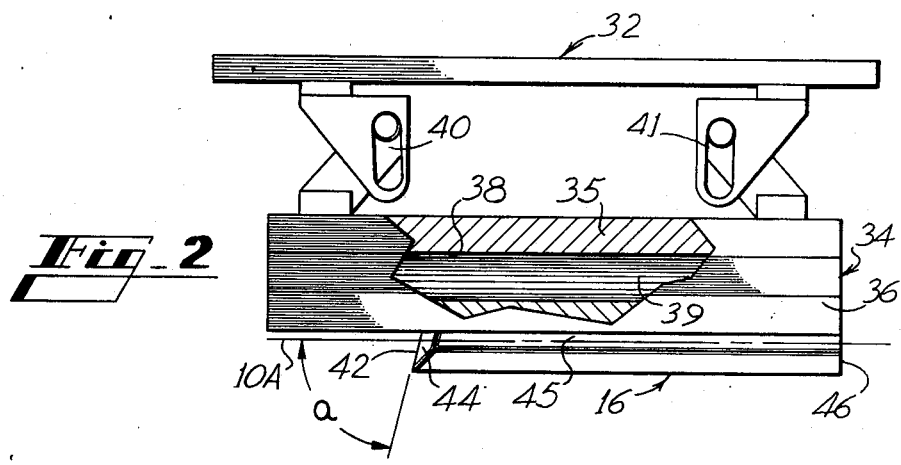
*Fig_2*
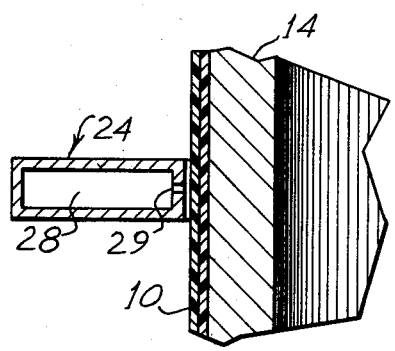
*Fig_3*
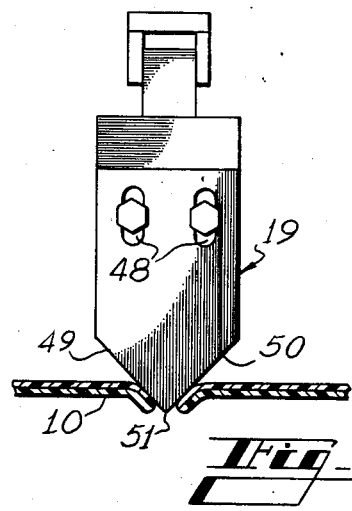
*Fig_4*

SLIT SEALING METHOD AND APPARATUS

INFORMATION DISCLOSURE STATEMENT

It has long been common practice in the plastics industry to extrude a tube of a thin plastic sheet, then to flatten the tube, and slit and seal the tube longitudinally to produce a plurality of smaller tubes. With the earlier polyethylene materials, the slit sealing was relatively easy to accomplish since the material is relatively easy to work with and to seal completely.

With later variations in plastic materials, some difficulties have been encountered in the slit sealing process, these difficulties including the buildup of plastic material on the slitting knife edge, and in the failure to achieve a proper seal. The use of heated knives, and the careful handling of the material both before and after slitting has achieved considerable success for some materials. An example of this technology is shown in U.S. Pat. No. 4,318,768 issued to James R. Johnson.

Presently, plastic materials have changed drastically, materials now commonly including linear low density polyethylene (LLDPE), the LLDPE being frequently co-extruded with other thermoplastics. Once again, the plastics do not seal properly with the prior equipment. More specifically, the LLDPE material frequently seals leaving pin holes in the seam; and, sometimes the seam simply is not sufficiently strong, but will yield under relatively low stress.

SUMMARY OF THE INVENTION

This invention relates generally to a method and apparatus for slit sealing thermoplastics, and is more particularly concerned with a method and apparatus whereby the plastic material is presealed using heated air followed by slit sealing with a heated blade.

The present invention provides a method wherein the extruded thermoplastic tube is flattened and passed over a roller, and the area to be subsequently slit is preheated using heated air. After the contact with the heated air, the sheet material engages a heated knife blade, the knife blade having a sharp edge oriented to roll a bead upwardly on the film. The slit edges of the film drag along the sides of the heated knife to complete the sealing. The edges are then spaced apart and held taut until the thermoplastic material is sufficiently cooled.

BRIEF DESCRIPTION OF THE DRAWINGS

These and other features and advantages of the present invention will become apparent from consideration of the following specification when taken in conjunction with the accompanying drawings in which:

FIG. 1 is a longitudinal cross-sectional view through one form of apparatus made in accordance with the present invention;

FIG. 2 is an enlarged side elevational view, partially in cross-section, showing the heated knife of the embodiment of the invention shown in FIG. 1;

FIG. 3 is an enlarged, fragmentary cross-sectional view taken along the line 3—3 in FIG. 1; and, FIG. 4 is a rear elevational view showing the edge separation means in detail.

DETAILED DESCRIPTION OF THE EMBODIMENT

Referring now more particularly to the drawings, and to that embodiment of the invention here presented by way of illustration, FIG. 1 illustrates the flattened tube of thermoplastic material 10 entering the apparatus at 10 and passing over a first roll 11. The film 10 passes around a second roll 12 which places the film in position to pass around the presealing roll 14. The roll 12 is positioned so the film 10 will engage the roll 14 in position to allow the film to remain in contact with the roll 14 for a substantial portion of the circumference of the roll 14. As here illustrated, the film 10 remains in contact with the roll 14 through an arc comprising approximately 50% or more of the roll 14.

As the film 10 leaves the roll 14, the film passes over an entry roll 15, engages the knife blade 16, and passes over an exit roll 18. Beyond the exit roll 18 there is the edge separator 19; and, leaving the edge separator 19, the film passes over the roll 20 which is a crowned roll to assist in maintaining the separation between the two pieces of plastic film. After the roll 20, the film passes over two additional guide rolls 21 and 22, and the film exits from the apparatus.

Returning now to the presealing roll 14, it will be seen that there is a manifold 24 extending around a portion of the presealing roll 14. The manifold 24 has an input passage at 25 for receiving heated air from the heater 26. This arrangement is shown in detail in the inventor's prior U.S. Pat. No. 4,308,087, and no further discussion is thought to be necessary for the arrangement to be understood by those skilled in the art.

Whereas, in the inventor's prior patent, the manifold, such as the manifold 24, was arranged to provide enough heat to accomplish a complete seal of the two layers of plastic material, such thoroughness is not required in the present invention. As will be better understood hereinafter, the manifold 24 provides only a preseal, and the complete seal will be accomplished by the heated knife 16.

Looking briefly at FIG. 3 of the drawings, it will be seen that the manifold 24 includes a central opening 28 for receiving heated air through the passage 25; and, a plurality of openings 29 extending around the manifold 24 direct heated air onto the film 10.

After the film 10 has been preheated by the heated air from the manifold 24, the film immediately passes to the entry roll 15. The entry roll 15 and exit roll 18 provide a stable span of film therebetween since it is important that the film 10 be well held during the final slit sealing operation. As here shown, the rolls 15 and 18 extend between plates such as the end plate 30, end plates 30 being held rigidly with respect to one another by means of an angle iron 31 fixed thereto as by welding or the like.

It is also important that the knife blade 16 be held accurately. It will be understood by those skilled in the art that the area of the film preheated by the manifold 24 should be precisely centered on the heated blade 16. To assist in accomplishing this, it will be seen that the blade 16 includes a mounting means 32 that provides variability in rotational aspect of the blade 16 as well as in transverse placement. Such arrangements are well known to those skilled in the art, and no further description is thought to be necessary.

For further discussion of the heated knife blade 16, attention is directed to FIG. 2 of the drawings. Here it will be seen that there is a knife block generally designated at 34, the knife block 34 being substantially conventional in the industry. The knife block 34 includes a top plate 35 and inwardly tapering sides 36. The center of the knife block 34 has a cavity 38 for receiving electric heaters 39. The electric heaters 39 heat the knife block 34, and heat is transferred through conduction to the blade 16.

While the knife block 34 is substantially conventional in the industry, the blade 16 is unique both in its construction and in its operation. Because the use of the blade 16 is critical in the present invention, the knife block 34 is here shown as including slotted mounting means 40 and 41 so the knife block 34 can be tilted, or sloped, if necessary. Because the knife body 34 includes the transverse pins riding in vertical slots, either end of the knife body 34 can be raised or lowered as may be necessary.

It has been discovered that, in the slit sealing of thermoplastics such as the LLDPE and co-extrusions therewith, the slit sealing knife blade should be carefully oriented to form a proper bead.

If the cutting edge of the slit sealing knife blade is precisely vertical, the plastic film engaging the knife blade will have a bead rolled at the slit edges; however, the bead will sometimes turn upwardly, and sometimes turn downwardly. This randomized orientation of the bead results in a poor seal, frequently having pinholes in the sealed edge.

In using apparatus such as that here shown, it has also been found that, if the knife blade is oriented with an obtuse angle between the cutting edge and the film, the bead will be turned consistently downwardly, but the resulting seal is not quite as good as if the bead is turned upwardly. Though the precise reason is not understood, it is possible that the fact that the bead drags along the exit roller 18 and otherwise engages rollers and the like while the material is somewhat heated may somewhat degrade the material.

In any event, it has been found to be preferable that the cutting edge of the knife blade 16 be oriented to form an acute angle with the bottom of the film so a bead will be consistently rolled upwardly.

With the foregoing in mind, attention is again directed to FIG. 2 of the drawings where the film line is indicated at 10A, and the cutting edge of the knife blade 16 is indicated at 42. It will be seen that the cutting edge 42 is a substantially sharpened edge, and the blade 16 tapers outwardly along the surface 44 until the full thickness of the knife blade at 45 is achieved. Thus, the film engages the sharp edge 42 of the heated blade 16, and the edge 42 forms the acute angle a with the entering film. Because of this angle, a bead will be rolled upwardly on the film. The cut edges of the film are then separated gradually by the tapered portion 44 of the knife blade 16, until the edges drag along the parallel sides 45 of the blade 16. While the film passes along the sides 45 of the blade 16, it will be understood that there is sufficient dwell time for the edges of the film to become completely sealed. Those skilled in the art will understand that film speeds and temperatures will vary to achieve the desired sealing of the material.

The rear end of the knife blade 16 is substantially straight as indicated at 46, so the slit edges of the film pass directly from the heated blade 16 to be held separated in open air.

It is desirable to maintain both separation of and tension on, the cut edges for a short time after the film has been slit sealed. For this purpose, the edge holding means 19 is utilized just beyond the exit roll 18 and before the crown roll 20. The edge holding means 19 is shown in more detail in FIG. 4 of the drawings, and it will be seen that the edge holding means 19 includes a thin sheet of material having slots 48 to allow adjustment of the positioning of the device 19. The lower end of the device 19 has inwardly tapering edges 49 and 50 which meet at a point 51. Because of this configuration, it will be seen that the point 51 can be urged into the slit in the sheet material 10, and the slit sealed edges of the material will be held taut and urged apart. From the edge holding means 19, the material 10 passes onto the crowned roll 20 where the edges are further maintained separated.

From the foregoing discussion, it will now be understood that the method of the present invention includes the presealing of a flattened tube of thermoplastic material, and subsequently slit sealing the presealed area, the slit sealing being accomplished by utilizing an angled knife blade to roll a consistent bead in one direction, preferably upwardly. Following slit sealing, the edges are maintained separated and in slight tension to preserve the quality of the sealed edges.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or the scope of the invention as outlined in the appended claims.

I claim:

1. A method for slit sealing thermoplastic sheet material, wherein said sheet material passes over support rolls and engages a heated knife, said method including the steps of passing said sheet material over a presealing roller before passing said material over said support rolls and contacting a band of said sheet material with heated air, subsequently engaging said band with said heated knife for slitting said sheet material into a plurality of pieces and sealing the slit edges, said step of engaging said band with said heated knife including the step of holding said knife at an angle with respect to the plane of said sheet material, said knife having a straight cutting edge extending through the plane of said sheet material and forming an acute angle between the lower surface of said sheet material, so that a bead is formed consistently on the upper surface of said sheet material during the slit sealing.

2. A method for slit sealing as claimed in claim 1, said method further including the steps of holding said slit edges taut and maintaining said edges separated following the steps of slitting and sealing said material.

3. A method for slit sealing as claimed in claim 2, wherein said step of engaging said band with said heated knife further includes the steps of separating said material with said cutting edge, and passing the slit edges of said material along the sides of said knife blade for achieving a seal on the slit edges.

4. A method for slit sealing as claimed in claim 3, and including the step of subsequently passing said slit material over a crowned roll for maintaining the separation of the pieces of material.

5. Slit sealing apparatus, for slitting a flattened tube of thermoplastic material and sealing the slit edges, said apparatus comprising a presealing roll for receiving said material therearound, means for engaging said material with heated air while said material is around said presealing roll, an entry roll adjacent to said presealing roll and parallel thereto for receiving said material from said presealing roll, an exit roll spaced from said entry roll and parallel thereto, a heated knife mounted between said entry roll and said exit roll, said heated knife including a blade located to engage said material as said material passes over said entry roll and said exit roll, said heated knife including a straight cutting edge extending through the place of said material, said cutting edge forming an angle of less than 90° with the lower surface of material moving towards said cutting edge.

6. Slit sealing apparatus as claimed in claim 5, said means for engaging said material with heated air including a curved manifold extending around an arc of the circumference of said presealing roll, adjustment means for said heated knife for allowing alignment of said knife so that said heated knife is laterally aligned with said manifold.

7. Slit sealing apparatus as claimed in claim 6, and further including edge holding means for holding the slit edges of said material, said edge holding means being supported adjacent to said exit roll and including tapered edges for engaging said slit edges of said material, the arrangement being such that said tapered edges engage said slit edges and urge said slit edges apart and down.

* * * * *

UNITED STATES PATENT AND TRADEMARK OFFICE
CERTIFICATE OF CORRECTION

PATENT NO. : 4,687,532
DATED : August 18, 1987
INVENTOR(S) : James R. Johnson

It is certified that error appears in the above-identified patent and that said Letters Patent are hereby corrected as shown below:

In column 5, line 5, change "place" to --plane--.

Signed and Sealed this

Eighth Day of December, 1987

Attest:

DONALD J. QUIGG

Attesting Officer

Commissioner of Patents and Trademarks